(12) United States Patent
Radzicki et al.

(10) Patent No.: US 9,321,003 B2
(45) Date of Patent: Apr. 26, 2016

(54) PROCESS STREAM UPGRADING

(71) Applicant: ExxonMobil Chemical Patents Inc., Baytown, TX (US)

(72) Inventors: Michael A. Radzicki, Houston, TX (US); Neeraj Sangar, League City, TX (US); Michael Moran, Humble, TX (US); Matthew B. Yarrison, Lexington, KY (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 84 days.

(21) Appl. No.: 14/181,855

(22) Filed: Feb. 17, 2014

(65) Prior Publication Data

US 2014/0316178 A1 Oct. 23, 2014

Related U.S. Application Data

(60) Provisional application No. 61/814,602, filed on Apr. 22, 2013.

(30) Foreign Application Priority Data

Jun. 25, 2013 (EP) .................................... 13173548

(51) Int. Cl.
*C07C 7/10* (2006.01)
*C07C 7/148* (2006.01)
*B01D 53/14* (2006.01)
*B01D 11/04* (2006.01)
*C10G 21/20* (2006.01)
*C10G 67/04* (2006.01)
*C10G 69/06* (2006.01)
*C10G 75/04* (2006.01)
*C10L 1/04* (2006.01)

(52) U.S. Cl.
CPC ........ *B01D 53/1462* (2013.01); *B01D 11/0488* (2013.01); *B01D 53/1425* (2013.01); *C10G 21/20* (2013.01); *C10G 67/04* (2013.01); *C10G 69/06* (2013.01); *C10G 75/04* (2013.01); *B01D 2252/20484* (2013.01); *B01D 2252/20489* (2013.01); *B01D 2256/24* (2013.01); *B01D 2257/304* (2013.01); *B01D 2257/504* (2013.01); *C10L 1/04* (2013.01); *C10L 2290/541* (2013.01)

(58) Field of Classification Search
CPC .................................. C07C 7/148; C07C 7/10
USPC .................................. 585/860, 862, 863, 950
See application file for complete search history.

(56) References Cited

U.S. PATENT DOCUMENTS

| | | |
|---|---|---|
| 3,598,881 A | 8/1971 | Kniel et al. |
| 3,696,162 A | 10/1972 | Kniel |
| 3,911,082 A | 10/1975 | Rottmayr et al. |
| 3,926,591 A | 12/1975 | Wildmoser et al. |
| 3,989,811 A | 11/1976 | Hill |
| 4,184,855 A | 1/1980 | Butwell et al. |
| 4,343,777 A | 8/1982 | Dannhorn et al. |
| 5,244,576 A | 9/1993 | DeRoeck et al. |

(Continued)

OTHER PUBLICATIONS

P.D. Clark: 'Kirk —Othmer Encyclopedia of Chemical Technology'. 2004, John Wiley & Sons: "Sulfur and Hydrogen Sulfide Recovery".

*Primary Examiner* — Thuan D Dang

(57) ABSTRACT

The invention generally relates to processes for upgrading a process stream, such as those containing $C_{2+}$ olefin and one or more acidic gases, to equipment useful in such processes, and to upgraded process streams.

13 Claims, 4 Drawing Sheets

(56) References Cited

U.S. PATENT DOCUMENTS

| | | |
|---|---|---|
| 5,885,422 A | 3/1999 | Kurukchi et al. |
| 6,372,121 B1 | 4/2002 | McClain et al. |
| 6,632,351 B1 | 10/2003 | Ngan et al. |
| 6,986,839 B2 | 1/2006 | Subramaniyam et al. |
| 6,989,046 B1 | 1/2006 | Slim et al. |
| 7,090,765 B2 | 8/2006 | Spicer et al. |
| 7,097,758 B2 | 8/2006 | Stell et al. |
| 7,138,047 B2 | 11/2006 | Stell et al. |
| 7,220,887 B2 | 5/2007 | Stell et al. |
| 7,235,705 B2 | 6/2007 | Stell |
| 7,244,871 B2 | 7/2007 | Stell et al. |
| 7,247,765 B2 | 7/2007 | Stell et al. |
| 7,297,833 B2 | 11/2007 | Beattie et al. |
| 7,311,746 B2 | 12/2007 | Stell et al. |
| 7,312,371 B2 | 12/2007 | Stell et al. |
| 7,351,872 B2 | 4/2008 | Stell et al. |
| 7,388,120 B2 | 6/2008 | Van Egmond |
| 7,488,459 B2 | 2/2009 | Stell et al. |
| 7,575,669 B2 | 8/2009 | Subramaniyam |
| 7,578,929 B2 | 8/2009 | Stell et al. |
| 7,820,035 B2 | 10/2010 | McCoy et al. |
| 8,083,931 B2 | 12/2011 | McCoy et al. |

PROCESS STREAM UPGRADING

PRIORITY CLAIM

This application claims priority to and the benefit of U.S. Provisional Application No. 61/814,602, filed Apr. 22, 2013 and EP 13173548.2, filed Jun. 21, 2013.

FIELD

The invention generally relates to processes for upgrading a hydrocarbon-containing process stream, such as those containing $C_{2+}$ olefin and one or more acidic gases, to equipment useful in such processes, and to upgraded process streams.

BACKGROUND $C_{2+}$ olefins can be used to produce many useful products. For example, ethylene and/or propylene can be polymerized to produce polymer, such as polyethylene, polypropylene, ethylene-propylene copolymer, etc. $C_{2+}$ olefins can be produced in conventional process; e.g., by one or more of catalytically converting alcohol, such as methanol; pyrolysing a hydrocarbon-containing feed, as in steam cracking; or catalytically cracking a hydrocarbon feed, as in fluidized catalytic cracking, hydrocracking, etc. Besides $C_{2+}$ olefins, effluents from these processes can contain acidic gases, e.g., $H_2S$ and/or $CO_2$. When the feeds to these processes contain sulfur and/or sulfur-containing molecules, such as in the catalytic cracking and/or steam cracking of crude oil and/or one or more fractions thereof, the acid gases generally include $H_2S$. Especially when steam cracking is utilized for producing the $C_{2+}$ $\alpha$-olefins, the effluent can also contain aldehyde, such as acetaldehyde.

It is conventional to utilize amine for removing one or more acid gases from a process stream containing $C_{2+}$ olefins. For example, $CO_2$ and $H_2S$ can be removed from a steam cracker effluent by contacting the effluent with caustic and/or amine, e.g., by an acid gas scrubbing process in caustic or amine towers. It has been observed that such acid gas scrubbing leads to foulant precursor formation, e.g., by condensation reactions of carbonyl compounds. Undesirable polymerization of the foulant precursors can foul and obstruct the flow of liquid through the acid gas removal system, especially during regeneration of the scrubbing solution.

One way to remove foulant precursors and foulants, and to lessen fouling during the regeneration, involves contacting the amine with an aromatic stream such as pyrolysis gasoline to remove a majority of the foulant and foulant precursors upstream of the regenerator. Foulant and foulant precursors are transferred to the aromatic stream, producing a rich aromatics stream which is conducted away from the process. Any remaining foulant precursors can then be removed in the regenerator. See, e.g., U.S. Pat. Nos. 3,926,591 and 7,575,669, which disclose conducting the rich aromatics stream to waste or an oil scrubbing column. Conducting away the rich aromatic stream entails disposal and operational difficulties. Moreover, disposing of the rich aromatic stream represents the loss of a valuable, aromatic-containing product. A process is therefore desired which removes foulants and foulant precursors from a scrubbing solution and which disposes of fewer aromatic hydrocarbons than the conventional processes.

SUMMARY OF THE INVENTION

In an embodiment, the invention generally relates to an amine mixture upgrading process, comprising:
(a) providing a first mixture, the first mixture comprising amine and foulant precursors;
(b) providing a second mixture, the second mixture comprising aromatic hydrocarbons;
(c) combining the first and second mixture;
(d) separating third and fourth mixtures from the combined first and second mixtures, wherein (i) the third mixture comprises ≥60.0% of the first mixture's amine, based on the weight of amine in the first mixture, and (ii) the fourth mixture comprises <40.0% of the first mixture's amine, based on the weight of amine in the first mixture, ≥60.0% of the first mixture's foulant precursors, based on the weight of foulant precursors in the first mixture, and ≥60.0% of the second mixture's aromatic hydrocarbons, based on the weight of aromatic hydrocarbons in the second mixture; and
(e) extracting amine from the fourth mixture to produce an extract and a raffinate, wherein (i) the extract comprises at least a portion of the fourth mixture's amine (e.g., ≥60.0% of the fourth mixture's amine based on the weight of the fourth mixture's amine) and (ii) the raffinate comprises at least a portion of the fourth mixture's aromatic hydrocarbon (e.g., ≥60.0% of the fourth mixture's aromatic hydrocarbon, based on the weight of the fourth mixture's aromatic hydrocarbon).

In another embodiment, a process for upgrading a hydrocarbon-containing process stream, the process comprising:
(a) providing a process stream comprising (i) ≥10.0 wt. % $C_{2+}$ olefins, (ii) ≥1.0 wt. % aromatics, (iii) ≥100.0 ppmw mercaptans, and (iv) ≥1.5×10³ ppmw $H_2S$, the weight percents and ppmw being based on the weight of the process stream;
(b) providing a lean aqueous amine mixture;
(c) contacting the process stream with the lean aqueous amine mixture and transferring to the lean aqueous amine mixture ≥60.0 wt. % of the process stream's $H_2S$, based on the weight of the process stream's $H_2S$, to produce (i) a rich aqueous amine mixture, the rich aqueous amine mixture comprising [HS⁻] ions and foulant precursors; and (ii) an upgraded process stream comprising (A) ≥60.0 wt. % of the process stream's olefins, based on the weight of the process stream's olefins, (B) ≥60.0 wt. % of the process stream's aromatics, based on the weight of the process stream's aromatics, (C) <40.0 wt. % of the process stream's $H_2S$, based on the weight of the process stream's $H_2S$, and (D) ≥60.0 wt. % of the process stream's mercaptans based on the weight of the process stream's mercaptans;
(d) separating a first aromatics mixture from the upgraded process stream, the first aromatics mixture comprising at least a portion of the upgraded process stream's mercaptans and ≥10.0 wt. % of the upgraded process stream's aromatics, based on the weight of the upgraded process stream's aromatics;
(e) hydroprocessing at least a portion of the first aromatics mixture (e.g., ≥1.0 wt. % based on the weight of the first aromatics mixture) to produce a second aromatics mixture; and
(f) combining the rich aqueous amine mixture with the second aromatics mixture to transfer to the second aromatics mixture ≥60.0 wt. % of the rich aqueous amine mixture's foulant precursors, based on the weight of the foulant precursors in the rich aqueous amine mixture, to produce an upgraded rich aqueous amine mixture and a rich aromatics mixture.

In yet another embodiment, the invention relates to a hydrocarbon conversion process, comprising;
(a) providing a feedstream, the feedstream comprising ≥10.0 wt. % hydrocarbon and ≥0.001 wt. % of one or more sulfur-containing molecules;
(b) exposing the feedstream to a temperature ≥400° C. under pyrolysis conditions to produce a process stream;
(c) providing a lean aqueous amine mixture, contacting the process stream with the lean aqueous amine mixture to produce first contacted mixtures, and then separating from the contacted mixtures (i) an upgraded process stream and (ii) a rich aqueous amine mixture, the rich aqueous amine mixture comprising foulant precursors;
(d) separating a first aromatics mixture from the upgraded process stream;
(e) hydroprocessing the first aromatics mixture to produce a second aromatics mixture;
(f) contacting the rich aqueous amine mixture with the second aromatics mixture to produce second contacted mixtures, and then separating from the second contacted mixtures (i) an upgraded rich aqueous amine mixture and (ii) a rich aromatics mixture, the rich aromatics mixture comprising ≥60.0 wt. % of the rich aqueous amine mixture's foulant precursors based on the weight of foulant precursors in the rich aqueous amine mixture;
(g) separating at least first and second portions from the rich aromatics mixture;
(h) contacting the first portion with an extractant to produce (i) an extract comprising ≥60.0 wt. % of the first portion's amine based on the weight of amine in the first portion and (ii) a raffinate comprising ≥60.0 wt. % of the first portion's foulant precursors based on the weight of foulant precursors in the first portion;
(i) combining ≥90.0 wt. % of the raffinate, based on the weight of the raffinate, with the first aromatics mixture before step (e); and
(j) combining ≥90.0 wt. % of the second portion, based on the weight of the second portion, with the second aromatics mixture before or during step (f).

DETAILED DESCRIPTION OF THE INVENTION

Figure 1:
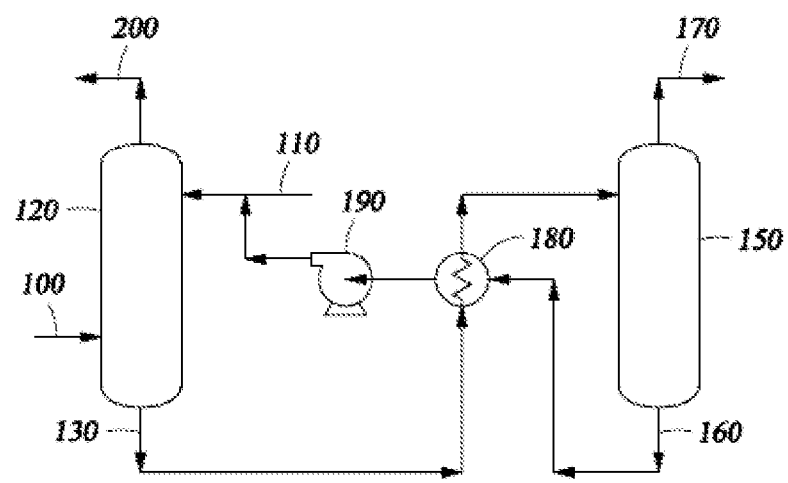
FIG. 1 schematically illustrates a process utilizing aqueous amine for removing one or more acidic gases from a process stream. An upgraded process stream is conducted away. The rich aqueous amine is regenerated for re-use.

Many common methods for producing unsaturated hydrocarbons, e.g., catalytic cracking, hydrocracking, catalytically converting alcohols to olefins, steam cracking, etc., produce an effluent process stream containing $C_{2+}$ olefins and heteroatom-containing molecules such as one or more of $CO_2$, $H_2S$, or carbonyls, such as acetaldehyde. For example, the process stream can comprise (i) carbonyls, (ii) ≥10.0 wt. % $C_{2+}$ olefins, (iii) ≥1.0 wt. % $C_{6+}$ aromatics, e.g., ≥1.0 wt. % $C_{7+}$ aromatics, (iv) ≥100.0 ppm by weight ("ppmw") mercaptans, and (i) ≥1.5×10³ ppmw $H_2S$, the weight percents and ppmw being based on the weight of the process stream. It is believed that carbonyls such as acetaldehyde form via the reaction between acetylene and water. The reaction proceeds by the addition of water across the triple bond of acetylene to form vinyl alcohol, and the vinyl alcohol rearranges to form acetaldehyde:

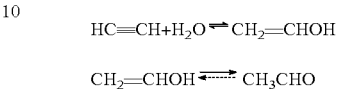

It has been observed that when the unsaturated molecules are produced in a reducing atmosphere, e.g., when produced by a steam cracking process having a significant molecular hydrogen yield, a portion of the acetaldehyde can undergo reduction to ethanol and then to ethylene. Acetaldehyde concentration is relatively higher when feeds such as crude oil and crude oil fractions (such as gas oils) are utilized because these feeds result in less molecular hydrogen in the process stream.

It is conventional to remove at least a portion of the $CO_2$ or $H_2S$ from process streams containing $C_{2+}$ hydrocarbon by contacting the process stream with amine, e.g., with an aqueous mixture comprising one or more amines. Conventional aqueous amine-containing mixtures are suitable for use in the invention, but the invention is not limited thereto. If desired, the amine-containing mixture can further comprises one or more physical solvents, e.g., those disclosed in U.S. Pat. No. 3,989,811 and/or one or more additives (e.g., for lessening the effects of fouling) such as those disclosed in U.S. Pat. No. 6,372,121. The amines utilized can be, e.g., alkanolamines and mixtures thereof. Alkanolamines are molecules containing both amine and hydroxyl groups. One or more of primary, secondary, or tertiary amine can be utilized, such as one or more primary, secondary, or tertiary alkanolamine. In certain embodiment the amine-containing mixture is an aqueous amine mixture, the aqueous amine mixture comprising 5.0 wt. % to 60.0 wt. % of one or more alkanolamines, such as 25.0 wt. % to 50.0 wt. %, based on the weight of the aqueous amine mixture. The balance of the mixture can be water, for example. In certain embodiments, the aqueous amine mixture comprises water and 5.0 wt. % to 60.0 wt. % of one or more of monoethanolamine ("MEA"), diethanolamine ("DEA"), or dipropanolamine ("DPA"), e.g., 25.0 wt. % to 50.0 wt. % of monoethanolamine. Before contacting the process stream, the aqueous amine mixture is called a "lean" aqueous amine mixture. Such lean aqueous amine mixtures generally have an acidic gas content (molar basis) in the range of about 5% to about 15% (mole of acid gas per mole of amine). After contacting the process stream (and absorbing at least a portion of one or more of the process stream's acidic gases) the lean aqueous amine mixture becomes a "rich" aqueous amine mixture. Such rich aqueous amine mixtures generally have an acidic gas content (molar basis) in the range of about 40% to about 50% (mole of acid gas per mole of amine).

One conventional process for removing acid gas is illustrated in FIG. 1, which schematically shows a process stream 100 (such as a steam cracker effluent) and a lean aqueous amine mixture 110 being conducted to contactor 120. The process stream and lean aqueous amine mixture are combined in contactor 120, resulting in (i) the removal from the process stream of at least a portion of the process stream's $H_2S$ and/or $CO_2$ to produce an upgraded process stream and (ii) the formation of a rich aqueous amine mixture containing one or more of [HS−] ions, carbamate ions, or bicarbonate ions removed from the process stream. For example, the rich aqueous amine mixture can comprise ≥100.0 ppm by weight of one or more of [HS−] ions, carbamate ions, or bicarbonate ions which have been removed from the process stream. As disclosed in, e.g., P. D. Clark, Sulfur and Hydrogen Sulfide Recovery, Kirk-Othmer Encyclopedia of Chemical Technology, $5^{th}$ Edition, John Wiley & Sons, 2004, absorption of $H_2S$ occurs by solubility and reaction with the free amine and the protonated amine to yield soluble hydrosulfide species. The removal of $CO_2$ is more complicated, involving carbamate and bicarbonate pathways. It is believed that the bicarbonate pathway is minor under most circumstances because the first step, formation of carbonic acid ($H_2CO_3$), is equilibrium limited. Carbamate formation is rapid, and for both $CO_2$+ and $H_2S$ removal, it is believed that the rate-limiting step is the mass transfer of the designated heteroatom molecular from the gas phase into the liquid phase.

When the lean aqueous amine solution comprises, e.g., monoethanolamine, and the process stream comprises $H_2S$ the following reactions are believed to occur:

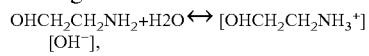
$OHCH_2CH_2NH_2+H_2O \leftrightarrow [OHCH_2CH_2NH_3^+][OH^-]$,

$OHCH_2CH_2NH_2 \leftrightarrow [OHCH_2CH_2NH_3^+][HS^-]$, and

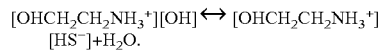
$[OHCH_2CH_2NH_3^+][OH] \leftrightarrow [OHCH_2CH_2NH_3^+][HS^-]+H_2O$.

Similarly, when the process stream comprises $CO_2$ the following reaction is believed to occur: $OHCH_2CH_2NH_2+H_2O \leftrightarrow [OHCH_2CH_2NH_3^+][OH^-]$. Carbamates and bicarbonates are believed to form according to the following pathways:
(i) $OHCH_2CH_2NH_2 \leftrightarrow OHCH_2CH_2NHC—C—OOH$
$OHCH_2CH_2NHC—C—OOH \leftrightarrow [OHCH_2CH_2NHC—C—OO—][OHCH_2CH_2NH_3^+]$,
i.e., the carbamate pathway, and
(ii) $[OHCH_2CH_2NH_3^+][OH—] \leftrightarrow [OHCH_2CH_2NH_3^+][HCO_3^-]+H_2O$, i.e., the bicarbonate pathway.

During contacting, the pressure is relatively high and temperature is relatively low, resulting in $H_2S$ and $CO_2$ absorption from the process stream into the lean aqueous amine mixture (arrows in the above reactions pointing to the left), to produce the "rich" aqueous amine mixture. The rich aqueous amine mixture can be regenerated by exposing it to a higher temperature and lower pressure than that utilized during $CO_2$ and $H_2S$ absorption, in order to evolve those molecules and produce a regenerated aqueous amine mixture. The regenerated aqueous amine mixture can be utilized (e.g., by recycling) as the lean aqueous amine mixture or a component thereof.

Because aqueous amine-containing mixtures, such as the lean aqueous amine mixture, are bases (albeit relatively weak bases, with a pH generally in the range of from about 10 to about 12), base-induced condensation reactions can occur (e.g., aldol condensation reactions) involving the carbonyl compounds, including aldehydes (e.g., acetaldehyde) and/or ketones. Foulant precursors and foulant resulting from condensation can appear as an oil having a reddish or reddish-brown color ("red oil"). Red oil can be present in an aromatics-soluble liquid phase, or, more commonly, in the form of an emulsion of the red oil and an aqueous component. The emulsion can comprise, e.g., the rich aqueous amine mixture, aldol condensation products, and polymer formed from the aldol condensation products. Shearing of the red oil, e.g., shearing of the emulsion, has been observed to result in further polymerization of the aldol condensation products. For the purposes of this description and its appended claims, the term "foulant precursors" means products of base-induced condensation reactions involving the carbonyl compounds in an amine-containing mixture. The polymers formed from aldol condensation products, whether by shearing or otherwise, are undesirable foulants. It is believed that foulant can also result from, e.g., $H_2S$ and mercaptan addition across the double bonds in the aldol condensation chain and/or the addition product of acetaldehyde and ethyl mercaptan. For the purposes of this description and its appended claims, the term "foulant" means polymer products of base-induced condensation reactions involving the carbonyl compounds in an amine-containing mixture, whether formed by aldol condensation products, by shearing, a combination thereof, or otherwise.

Foulant precursors and foulants adhere to the contacting and regeneration equipment (and the interconnecting piping) utilized for the $CO_2$ and/or $H_2S$ removal, resulting in a loss of removal efficiency of $CO_2$ and $H_2S$ from the process stream (during contacting with the lean aqueous amine mixture) and from the rich aqueous amine mixture during regeneration. Removing the deposited polymer, generally with the contactor and/or the regenerator off-line, is time consuming and expensive.

Fouling can be lessened, such as by removing from the rich aqueous amine mixture at least a portion of that mixture's foulant precursors and foulant, e.g., by removing at least a portion of the rich aqueous amine mixture's red oil to produce an upgraded rich aqueous amine mixture. This can be accomplished by combining the rich aqueous amine mixture (the "first mixture") with a second mixture, the second mixture comprising aromatic hydrocarbons, which leads to a transfer of at least a portion of the red oil from the aqueous first mixture (in which red oil is generally not miscible) to the second mixture (in which the red oil is generally miscible). The combined first and second mixtures can be conducted to a separation stage, e.g., for separating from the combined mixtures (a) a third mixture (the upgraded rich aqueous amine mixture) comprising (i) amine and (ii) one or more of dissolved $H_2S$, [HS−] ions, carbamate ions, or bicarbonate ions and (b) a fourth mixture (a rich aromatics mixture) comprising amine, aromatic hydrocarbons, and foulant precursors. The amount of amine in the fourth mixture is generally ≤0.5 times the amount of amine in the third mixture. The amount of foulant precursors in the fourth mixture is generally ≥2.0 times the amount of foulant precursors in the third mixture. The first, second, third, and fourth mixtures will now be described in more detail. The invention is not limited to these mixtures, and this description is not meant to foreclose other mixtures within the broader scope of the invention.

In certain embodiments, the first mixture is a rich aqueous amine mixture, the mixture comprising, e.g., one or more amines, and generally further comprising water. For example, the first mixture can comprise 5.0 wt. % to 60.0 wt. % of one or more primary, secondary, or tertiary alkanolamine, based on the weight of the first mixture. The amine can include of one or more of monoethanolamine, diethanolamine, or dipropanolamine, and the first mixture's amine can comprises ≥50.0 wt. % of one or more of monoethanolamine ("MEA"), diethanolamine ("DEA"), or dipropanolamine ("DPA"), based on the weight of amine in the first mixture. In certain embodiments, the first mixture comprises water, ≥ about 0.1 wt. % of one or more alkanolamine, ≥5.0 wt. % of one or more of carbamates, thiocarbamates, bicarbonates, and ≥ about 0.1 wt. % of red oil (a mixture of foulants and/or foulant precursors), the weight percents being based on the weight of the first mixture. The carbamates, thiocarbamates, bicarbonates can be, e.g., salts (or ionic components thereof) are derived from one or more acidic gases, such $CO_2$, $H_2S$, mercaptans, etc. For example, the first mixture can comprise 0.1 wt. % to about 2.0 wt. % of alkanolamine, e.g., one or more of MEA, DEA, or DPA, such as MEA; about 10.0 wt. % to about 20.0 wt. % of one or more acid gas salts carbamates, thiocarbamates, bicarbonates, etc., the salts being derived from one or more of $CO_2$, $H_2S$, or mercaptans; about 0.1 wt. % to about 10.0 wt. % of foulant precursors, and about 0.2 wt. % to about 1.0 wt. % of hydrocarbons having a number of carbon atoms in the range of 2 to 5; the balance of the first mixture being water. The second mixture can comprise, e.g., a mixture of aromatics, such as ≥50.0 wt. % of aromatics, based on the weight of the second mixture, e.g., ≥75.0 wt. %. The aromatics can be $C_{7+}$ aromatics.

The third mixture (e.g., an upgraded rich aqueous amine mixture) can be conducted away for regeneration and, e.g., re-use, such as for producing the lean aqueous amine mixture. Since at least a portion of foulant precursors have been removed, regeneration of the third mixture leads to less fouling in the regenerator and associated piping than would regeneration of the rich aqueous amine mixture (the first mixture). In certain embodiments, the third mixture comprises ≥50.0 wt. % of the first mixture's water, based on the weight of water in the first mixture; ≥50.0 wt. % of the first mixture's amine, based on the weight of amine in the first mixture; and ≥100.0 ppm by weight of one or more of [$HS^-$] ions, carbamate ions, or bicarbonate ions, based on the weight of the third mixture. For example, the third mixture can one or more of (i) ≥50.0% of the first mixture's [$HS^-$] ions, based on the weight of [$HS^-$] ions in the first mixture, (ii) ≥50.0% of the first mixture's carbamate ions based on the weight of carbamate ions in the first mixture, or (iii) ≥50.0% of the first mixture's bicarbonate ions based on the weight of bicarbonate ions in the first mixture. Optionally, the process further comprises regenerating the third mixture, e.g., by removing from the third mixture one or more of (i) ≥75.0 wt. % of the third mixture's [$HS^-$] ions, based on the weight of the third mixture's [$HS^-$] ions, (ii) ≥75.0 wt. % of the third mixture's carbamate ions based on the weight of the third mixture's carbamate ions, or (iii) ≥75.0 wt. % of the third mixture's bicarbonate ions based on the weight of the third mixture's bicarbonate ions. In certain embodiments, the third mixture comprises ≤0.1 wt. % of foulant precursors, e.g., ≤0.05 wt. %, such as ≤0.01 wt. %, based on the weight of third mixture.

The fourth mixture, now containing at least a portion of the first mixture's foulant precursors and a significant amount of the second mixture's aromatics can be conducted away from the process for, e.g., disposal or possible use as a low-value fuel oil blending component. Such uses of the fourth mixture are generally considered detrimental because they represent a loss of a relatively high value stream (aromatics) to a relatively low value use—disposal or fuel oil blending.

In certain embodiments, the invention is based in part on the development of a process which avoids the loss of at least a portion of the fourth mixture to these relatively low-value uses. For example, certain embodiments the invention relate to separating from the fourth mixture two components (i) amine and (ii) aromatic hydrocarbons and foulant precursors. The fourth mixture's amine can be utilized, e.g., for producing the lean aqueous amine mixture. The second component, now with a lessened amine content (amine is a hydroprocessing catalyst poison), can be hydroprocessed to convert sulfur-containing foulant precursors and/or foulant to $H_2S$. Following $H_2S$ removal, the now upgraded second component can be further upgraded to remove saturated hydrocarbon, with at least a portion of the remaining aromatic hydrocarbons being used, e.g., for producing the second mixture.

Other aspects of the invention are based on the development of a more efficient pyrolysis process, e.g., a more efficient steam cracking process, where at least a portion of the second mixture (a mixture of aromatics) is obtained by separating naphtha boiling range hydrocarbon from the process stream. For example, in certain embodiments, at least a portion of the aromatics utilized for removing foulant precursors from the first mixture (e.g., ≥1.0 wt. %, such as ≥10.0 wt. %, or ≥25.0 wt. %, or ≥50.0 wt. %, or ≥75.0 wt. %, or ≥90.0 wt. %, based on the weight of these aromatics) is obtained from a stream of $C_{7+}$ hydrocarbons that has been separated from the process stream and, optionally, subjected to hydroprocessing such as mild hydrotreating. These embodiments lessen or entirely obviate the need to introduce a relatively high-value aromatics stream from outside the process for the purpose of rich aqueous amine upgrading. In certain embodiments, the invention is operated continuously. In other embodiments, the invention is operated semi-continuously, or in batch mode.

The invention will now be described in more detail with respect to a process for producing unsaturated hydrocarbon by pyrolysis. The invention is not limited to this embodiment, and this description is not meant to foreclose other embodiments within the broader scope of the invention.

Producing a Process Stream by Pyrolysis

In certain embodiments, the process stream is produced by pyrolysing a feed comprising hydrocarbon, e.g., substantially saturated hydrocarbon, optionally in the presence of water (e.g., steam). The feed to the pyrolysis can comprise, e.g., ≥10.0 wt. % hydrocarbon based on the weight of the feed, e.g., ≥15.0 wt. %, such as ≥25.0 wt. %, with the balance being one or more diluents, e.g., molecular hydrogen and/or steam. Although the feed's hydrocarbon component can comprise, e.g., one or more light hydrocarbons such as methane, ethane, propane, etc., it can be particularly advantageous for the feed's hydrocarbon component to comprise a significant amount of higher molecular weight hydrocarbons, e.g., ≥1.0 wt. % based on the weight of the feed of hydrocarbons that are in the liquid phase at atmospheric pressure. Although utilizing such a feed can be economically advantageous, the pyrolysis effluent in these cases has been observed to contain a greater amount of acetaldehyde compared to that found when a feed of primarily ethane is used.

The feed to the pyrolysis (the "pyrolysis feed") can further comprise diluent, e.g., one or more of nitrogen, water, etc., e.g., ≥1.0 wt. % diluent based on the weight of the pyrolysis feed, such as ≥25.0 wt. %. When the pyrolysis is steam cracking, the pyrolysis feed can be produced by combining the pyrolysis feed's hydrocarbon component with a diluent comprising steam, e.g., at a ratio of 0.2 to 4.0 kg steam per kg hydrocarbon.

Figure 2:
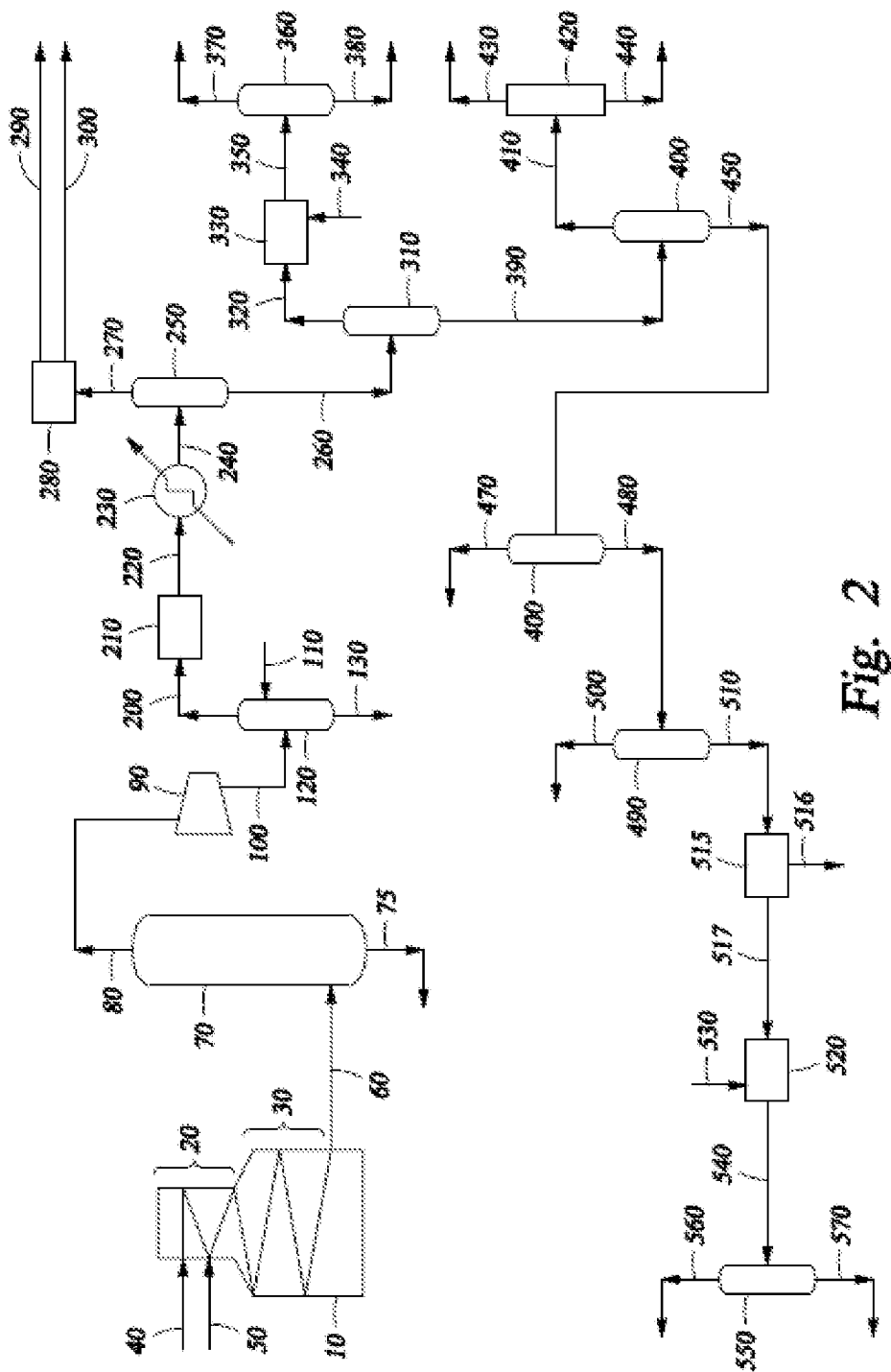
FIG. 2 schematically illustrates a process for producing olefins, and aromatics by steam cracking a hydrocarbon feed.

In certain embodiments, the pyrolysis feed's hydrocarbon component comprises ≥10.0 wt. %, e.g., ≥50.0 wt. %, such as ≥90.0 wt. % (based on the weight of the hydrocarbon component) of one or more of naphtha, gas oil, vacuum gas oil, crude oil, resid, or resid admixtures; including those comprising ≥ about 0.1 wt. % asphaltenes. Suitable crude oils include, e.g., high-sulfur virgin crude oils, such as those rich in polycyclic aromatics. Optionally, the pyrolysis feed's hydrocarbon component comprises sulfur, e.g., ≥0.001 wt. % sulfur, or ≥0.01 wt. %, or ≥0.1 wt. % (e.g., ≥0.001 wt. %, or ≥0.01 wt. %, or ≥0.1 wt. % of one or more sulfur-containing molecules), the weight percents being based on the weight of the hydrocarbon component, such as ≥1.0 wt. %, such as in the range of about 1.0 wt. % to about 5.0 wt. %. Such a pyrolysis feed can be pyrolysed in, e.g., a pyrolysis furnace, where the pyrolysis feed is exposed to a temperature ≥400° C., e.g., in the range of 400° C. to 900° C., and a pressure ≥0.1 bar (absolute), for a residence time in the range of from about 0.01 second to 5.0 second. The invention will now be described in terms of a representative steam cracking process. The invention is not limited to this embodiment, and this description is not meant to foreclose other embodiment within the broader scope of the invention. The representative steam cracking process utilizes a feed (a steam cracker feed) having a hydrocarbon component which comprises ≥50.0 wt. % based on the weight of the hydrocarbon component of one or more of waxy residues, atmospheric residues, naphtha, residue admixtures, or crude oil. The steam cracker feed's hydrocarbon component comprises sulfur (such as in the form of sulfur-containing molecules), e.g., ≥0.1 wt. % sulfur based on the weight of the hydrocarbon component, e.g., ≥1.0 wt. %, such as in the range of about 1.0 wt. % to about 5.0 wt. %. The steam cracker feed's diluent comprises, e.g., ≥95.0 wt. % water based on the weight of the diluent. As shown in FIG. 2, the steam cracker feed's hydrocarbon component is conducted via line 40 to a steam cracker furnace 10 having two main sections: a convection section 20 and a radiant section 30. The feed's hydrocarbon component enters the convection section of the furnace where it is heated and vaporized, e.g., by indirect contact with hot flue gas from the radiant section and by direct contact with the steam component, which is added to the hydrocarbon component via line 50 to produce the steam cracker feed.

Optionally, the steam cracker furnace further comprises at least one vapor/liquid separation device (sometimes referred to as flash pot or flash drum) integrated therewith, for upgrading the steam cracker feed's hydrocarbon component. Such vapor/liquid separator devices are particularly suitable when the steam cracker feed's hydrocarbon component comprises ≥ about 0.1 wt. % asphaltenes based on the weight of the steam cracker feed's hydrocarbon component, e.g., ≥ about 5.0 wt. %. Conventional vapor/liquid separation devices can be utilized to do this, though the invention is not limited thereto. Examples of such conventional vapor/liquid separation devices include those disclosed in U.S. Pat. Nos. 7,138,047; 7,090,765; 7,097,758; 7,820,035; 7,311,746; 7,220,887; 7,244,871; 7,247,765; 7,351,872; 7,297,833; 7,488,459; 7,312,371; and 7,235,705, which are incorporated by reference herein in their entirety. Suitable vapor/liquid separation devices are also disclosed in U.S. Pat. Nos. 6,632,351 and 7,578,929, which are incorporated by reference herein in their entirety. Generally, when using a vapor/liquid separation device, the composition of the vapor phase leaving the device is substantially the same as the composition of the vapor phase entering the device, and likewise the composition of the liquid phase leaving the flash drum is substantially the same as the composition of the liquid phase entering the device, e.g., the separation in the vapor/liquid separation device can consist essentially of a physical separation of the two phases entering the drum.

The steam cracker feed is then introduced into the radiant section 30, where at least a portion of the feed is exposed to a temperature ≥400° C. in order to convert at least a portion of the feed's hydrocarbon molecules to $C_{2+}$ olefins by pyrolysis. Optionally, the steam cracker feed is conducted to the radiant section via crossover piping (not shown). Suitable pyrolysis conditions in the radiant section include, e.g., exposing the pyrolysis feed to a temperature (measured at the radiant outlet) ≥400° C., e.g., in the range of 400° C. to 900° C., and a pressure ≥0.1 bar (absolute), for a residence time in the range of from about 0.01 second to 5.0 seconds. For example, the steam cracking conditions can include one or more of (i) a temperature ≥760° C., e.g., in the range of about 760° C. to about 880° C.; (ii) a pressure ≥0.5 bar (absolute), e.g., in the range of from about 1.0 bar to about 5.0 bar, such as in the range of from about 1.1 to about 2.5 bar; or (iii) a residence time in the range of from about 0.10 to about 2.0 seconds.

The radiant section's effluent is conducted away via line 60, and generally comprises, e.g., the $C_{2+}$ olefins, molecular hydrogen, acetylene, steam, aldehyde, acidic gases such as $H_2S$ and/or $CO_2$, mercaptans, and unconverted feedstream components.

The radiant section's effluent can be quenched (e.g., by contacting with water), and relatively high-molecular weight components (e.g., steam cracker gas oil) removed via line 75, in separation stage 70. Conventional separation equipment can be utilized in separation stage 70, e.g., one or more flash drums, fractionators (such as one or more primary fractionators), water-quench towers, indirect condensers, etc., such as those described in U.S. Pat. No. 8,083,931, which is incorporated by reference herein in its entirety. Stages for removing heat (such as one or more transfer line heat exchangers) and removing tar (such as tar drums) can be located in or upstream of stage 70 if desired. The cooled effluent is conducted away from stage 70 via line 80, and is then compressed in stage 90 to produce a process stream 100. When utilizing the specified steam cracker feed and the specified steam cracker conditions, the process stream can comprise, e.g., aldehyde, ≥10.0 wt. % of $C_{2+}$ olefins; ≥1.0 wt. % of $C_{6+}$ aromatics; ≥0.1 wt. % total RSH, where R is one or more of hydrogen or $C_{1+}$ alkyl or isoalkyl; and ≥0.1 wt. % $CO_2$, the weight percents being based on the weight of the process stream. For example, in certain embodiment, the process stream comprises aldehyde, 15.0 wt. % to 30.0 wt. % $C_{2+}$ olefins; 1.0 wt. % to 30.0 wt. % $C_{6+}$ aromatics; ≥0.1 wt. % total RSH, where R is one or more of hydrogen or $C_1$ to $C_4$ alkyl and/or isoalkyl; and 0.1 wt. % to 5.0 wt. % $CO_2$. In certain embodiments, the process stream comprises ≥0.01 wt. % aldehyde, e.g., ≥0.1 wt. % acetaldehyde, based on the weight of the process stream.

A lean aqueous amine mixture is provided via line 110 to stage 120, where the process stream contacts and combines with the lean aqueous amine mixture. At least a portion of the process stream's acidic gases, e.g., $H_2S$ and/or $CO_2$ are removed from the process stream in stage 120, and an upgraded process stream is conducted away from stage 120 via line 200, the upgraded process stream containing lesser amounts of $H_2S$ and/or $CO_2$ than the process stream, such as 50% less $H_2S$ and/or $CO_2$, or 75% less, or 90% less (on a weight basis). At least a portion of the process stream's acidic gases, e.g., $H_2S$ and/or $CO_2$ are transferred from the process stream to the aqueous amine mixture in stage 120, and these (or ionized fragments thereof) are conducted away as components of the rich aqueous amine mixture via line 130. In certain embodiments, at least a portion of the process stream is combined in stage 120 with lean aqueous amine mixture and ≥50.0 wt. % of the process stream's $H_2S$, based on the weight of the process stream's $H_2S$, is transferred to the lean aqueous amine mixture to produce (i) a rich aqueous amine mixture, the rich aqueous amine mixture comprising [HS⁻] ions and foulant precursors; and (ii) an upgraded process stream comprising (A) ≥50.0 wt. % of the process stream's olefins, based on the weight of the process stream's olefins, (B) ≥50.0 wt. % of the process stream's aromatics, based on the weight of the process stream's aromatics, (C) <50.0 wt. % of the process stream's $H_2S$, based on the weight of the process stream's $H_2S$, and (D) mercaptans. Although they are not required, the invention is compatible with additional removal stages, such as those utilizing caustic for removing $CO_2$ from the upgraded process stream.

At least a portion of any water in the upgraded process stream can be removed in stage 210, which can utilize e.g., conventional drying technology, though the invention is not limited thereto. A dried process stream is conducted away from stage 210 via line 220 and is then exposed to a temperature of, e.g., ≤100.0° C. in stage 230 to produce a cooled process stream. The cooled process stream is conducted via line 240 to separation stage 250, where a stream comprising primarily a mixture of methane and molecular hydrogen is conducted away via line 270. If desired, molecular hydrogen (line 290) and/or methane (line 300) can be separated from the mixture, utilizing, e.g., one or more cold boxes 280.

A demethanized process stream can be conducted away from separation stage 250 via line 260 to separation stage 310 for separating at least a portion of any $C_2$ hydrocarbon from the demethanizer process stream. The $C_2$ hydrocarbon (generally a mixture of ethane, ethylene, and acetylene) can be conducted away from stage 310 via line 320 to acetylene conversion stage 330. Stage 330 utilizes molecular hydrogen from line 340 (obtained, e.g., from line 290) and a catalytically effective amount of at least one acetylene conversion catalyst operating under acetylene conversion conditions to convert at least a portion of the acetylene to ethylene. An upgraded $C_2$ hydrocarbon mixture is conducted away from stage 330 via line 350 to separation stage 360 (e.g., a splitter) for separating ethylene (conducted away via line 370) from ethane (conducted away via line 380).

$C_{3+}$ hydrocarbon is conducted away from stage 310 via line 390 to stage 400, for separating $C_3$ hydrocarbons and conducting these away via line 410. A splitter 420, for example, can be utilized from separating propylene (conducted away via line 430) and propane (conducted away via line 440).

$C_{4+}$ hydrocarbon is conducted away from stage 400 via line 450 to separation stage 460, for separating $C_4$ hydrocarbons (conducted away via line 470) and $C_{5+}$ hydrocarbons, which are conducted via line 480 to separation stage 490. $C_5$ hydrocarbons are separated from the $C_{5+}$ hydrocarbons in stage 490, and are conducted away via line 500. $C_{6+}$ hydrocarbons are conducted from stage 490 to separation stage 515 via line 510 for removing a gas oil from the $C_{6+}$ hydrocarbons, the gas oil comprising molecules having atmospheric boiling points that are greater than the naphtha boiling range. The gas oil can be conducted away via line 516, and utilized for fuel oil blending, for example. A naphtha boiling-range effluent comprising $C_{6+}$ hydrocarbons (a first aromatics mixture) can be conducted away from stage 515 via line 517 to hydroprocessing stage 520, for hydroprocessing the $C_{6+}$ hydrocarbons in the presence of molecular hydrogen (added via line 530, and obtained, e.g., from line 290) and a catalytically effective amount of at least one hydroprocessing catalyst.

When utilizing the specified steam cracker feed and the specified steam cracker conditions, the $C_{6+}$ stream conducted to stage 520 comprises aromatics (such as ≥25.0 wt. % aromatics based on the weight of the $C_{6+}$ stream), e.g., (i) $C_6$ aromatics such as benzene, (ii) $C_{7+}$ aromatics, and (iii) mercaptans, such as a mixture of $C_{3+}$ mercaptans. It is believed that the mercaptans are present in this stream primarily for two reasons: (i) the amine extraction of stage 120 is less effective for sulfur-containing molecules having a molecular weight that is greater than that of $H_2S$ and (ii) $C_{3+}$ mercaptans have an atmospheric boiling point greater than that of the $C_1$ to $C_5$ hydrocarbons separated from the upgraded process stream in stages 250, 310, 400, and 490.

When utilizing the specified steam cracker feed and the specified steam cracker conditions, it has been observed that ≥90.0 wt. % of sulfur-containing molecules in the $C_{6+}$ hydrocarbon stream of line 517 (e.g., ≥90.0 wt. % of $C_{3+}$ mercaptans), based on the weight of sulfur-containing molecules that are present in the $C_{6+}$ hydrocarbon stream of line 517, can be removed using mild hydrotreating conditions. The term "mild hydrotreating" means hydrotreating conditions that saturate fewer than 10.0 wt. % of aromatics present in the hydrotreater feed (e.g., fewer than 10.0 wt. % of aromatics present in the $C_{6+}$ hydrocarbon stream), based on the weight of aromatics present in the hydrotreater feed. It has been observed that mild hydrotreating is particularly useful when the steam cracker feed's hydrocarbon component comprises ≥1.0 wt. % sulfur, based on the weight of the steam cracker feed's hydrocarbon component. While not wishing to be bound by any theory or model, it is believed that the mild hydrotreating removes molecules that would otherwise react with foulant precursors when the aromatics-containing stream is contacted with the rich aqueous amine mixture. At least a portion of any $H_2S$ is removed (not shown) from hydrotreated $C_{6+}$ stream, and the stream is then conducted via line 540 to stage 550 for separating $C_6$ hydrocarbons (conducted away via line 560) and $C_{7+}$ hydrocarbons, which are conducted away via line 570. This $C_{7+}$ hydrocarbon stream (a second aromatics mixture) boils at atmospheric pressure in the naphtha boiling range, and is generally suitable for high value uses such as gasoline blending. The second aromatics mixture generally comprises ≥1.0 wt. % of the first aromatics mixture (based on the weight of the first aromatics mixture), e.g., ≥10.0 wt. %, such as ≥20.0 wt. %, or ≥50.0 wt. %, or more. The second aromatics mixture can comprise, e.g., ≥25.0 wt. %, such as ≥50.0 wt. %, or ≥75.0 wt. %, or ≥90.0 wt. % of aromatics (such as $C_{7+}$ aromatics), based on the weight of the second aromatics mixture.

When utilizing the specified steam cracker feed and the specified steam cracker conditions, it has been found that the $C_{7+}$ hydrocarbon stream (the second aromatics mixture) is present in a sufficient amount and contains sufficient aromatics to be useful for removing at least a portion of the red oil (e.g., foulant precursors) from the rich aqueous amine mixture that is conducted away from stage 120 via line 130. In certain embodiments, the rich aqueous amine mixture is combined with the $C_{7+}$ hydrocarbon stream at a weight ratio in the range of about 25.0 to about 100.0. (rich aqueous amine mixture:$C_{7+}$ hydrocarbon stream), such as in the range of about to 35.0 to about 75.0. Under the specified conditions, this can result in (i) the combined mixture (of rich aqueous amine mixture $C_{7+}$ hydrocarbon stream) containing ≥30.0 wt. % aromatics (such as ≥40.0 wt. % aromatics) based on the weight of the combined mixture, and (ii) a transfer to the $C_{7+}$ hydrocarbon stream of ≥50.0 wt. %, e.g., ≥75.0 wt. %, such as ≥90.0 wt. % of the red oil (e.g., mixed foulant and foulant precursors) in the rich aqueous amine mixture (based on the weight of the red oil in the rich aqueous amine mixture). The $C_{7+}$ hydrocarbon stream:red oil weight ratio can be, e.g., in the range of about 3.0 to about 6.0, such as in the range of about 4.0 to about 5.0, during the combining of the rich aqueous amine mixture with the $C_{7+}$ hydrocarbon stream. When the $C_{7+}$ hydrocarbon stream:red oil weight ratio is in the range of about 3.0 to about 6.0, it has been observed that the mixture of $C_{7+}$ hydrocarbon stream and red oil has a specific gravity in the range of about 0.85 to about 0.95 (such as about 0.9), which is compatible with utilizing gravity separation to separate the aqueous amine phase from the combined red oil+$C_{7+}$ hydrocarbon phase.

Certain embodiments for combining a $C_{7+}$ hydrocarbon stream with a rich aqueous amine mixture will now be described in more detail. The invention is not limited to these embodiments, nor is this description meant to foreclose other embodiments within the broader scope of the invention.

Removing Foulant Precursors from a Representative Rich Aqueous Amine Mixture

In certain embodiments, a lean aqueous amine mixture 110 is combined with the specified process stream 100 obtained from steam cracking the specified steam cracker feed under the specified steam cracker conditions. The lean aqueous amine mixture can comprise, e.g., ≥10.0 wt. % MEA, such as 10.0 wt. % to 30.0 wt. % MEA, based on the weight of the lean aqueous amine mixture, with the balance being water. Generally, sufficient lean aqueous amine mixture is provided to stage 120 to achieve an acidic gases:MEA molar ratio in the range of 0.5 to 0.6, e.g., 0.5 moles of $H_2S+CO_2$ per mole of MEA.

As shown in FIG. 1, the mixtures can be combined in contactor/separator stage 120, with a rich aqueous amine mixture being conducted away from stage 120 via line 130. Contacting conditions in stage 120 include, e.g., a temperature in the range of about 35° C. to about 55° C., a pressure in the range of about 5 bar to about 20 bar, and a sufficient lean aqueous amine mixture flow rate to achieve 0.1 to 0.6 moles of acid gas per mole of alkanolamine. An upgraded process stream is conducted away from stage 120 via line 200, and can be further processed as described in the previous section and shown schematically in FIG. 2.

In conventional processes, rich aqueous amine mixture conducted via line 130 to heat exchanger 180, where the rich aqueous amine mixture is heated and then conducted to stage 150 for regeneration. For the specified conditions in stage 120, the rich aqueous amine mixture can comprise, e.g., ≥1.0 wt. % MEA, such as 1.0 wt. % to 2.0 wt. % MEA; ≥10.0 wt. % of one or more acid gas salts (e.g., one or more of R—$NH_3SH$ and/or $RNH_3CO$, where R is hydrogen and/or $C_{1-10}$ alkyl or isoalkyl), such as 10.0 wt. % to about 25.0 wt. % of one or more acid gas salts; ≥0.1 wt. % of red oil (e.g., foulant and foulant precursors), such as 0.2 wt. % to about 0.6 wt. % red oil; and ≥0.1 wt. % $C_{1+}$ hydrocarbon (e.g., dissolved light hydrocarbon gases), such as 0.1 wt. % to 1.0 wt. % of $C_1$ to $C_4$ gases, the weight percents being based on the weight of the rich aqueous amine mixture. The balance of the rich aqueous amine mixture generally is water, e.g., the balance comprises, consists essentially of, or consists of water.

When the specified rich aqueous amine mixture is utilized, regeneration conditions in stage 150 include, e.g., a temperature in the range of about 115° C. to about 130° C. and a pressure in the range of about 1.1 bar to about 2.0 bar. In certain embodiments, the regeneration is conducted under conditions that are sufficient to remove from the third mixture one or more of (i) ≥75.0 wt. % of the third mixture's [$HS^-$] ions, based on the weight of the third mixture's [$HS^-$] ions, (ii) ≥75.0 wt. % of the third mixture's carbamate ions based on the weight of the third mixture's carbamate ions, or (iii) ≥75.0 wt. % of the third mixture's bicarbonate ions based on the weight of the third mixture's bicarbonate ions.

A regenerated aqueous amine mixture is conducted away from stage 150 via line 160, through heat exchanger 180 (for transferring heat to the rich aqueous amine mixture). If desired, the regenerated aqueous amine mixture can be re-used for process stream upgrading, e.g., by recycling the regenerated aqueous amine mixture to stage 120 via pump 190. $H_2S$ and/or $CO_2$ removed from the rich aqueous amine mixture is conducted away from stage 150 via line 170. The $H_2S$ can be, e.g., converted to sulfur and molecular hydrogen in a conventional process, such as the Claus process.

In accordance with the invention, at least a portion of any foulant precursors are removed from the rich aqueous amine mixture by contacting the rich aqueous amine mixture with aromatics before regenerating the amine mixture in stage 150.

Figure 3:
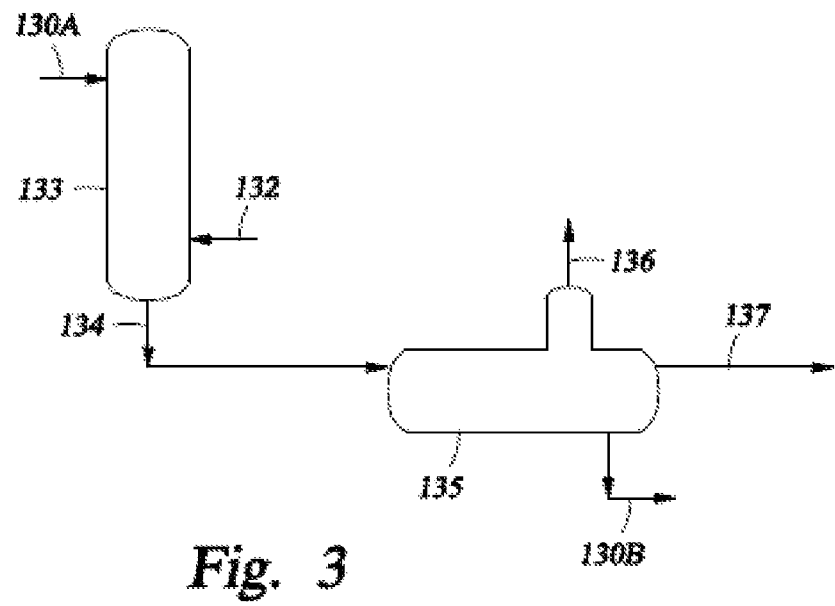
FIG. 3 schematically illustrates a process utilizing an aromatics mixture for removing foulant precursors from rich aqueous amine.
Figure 4:
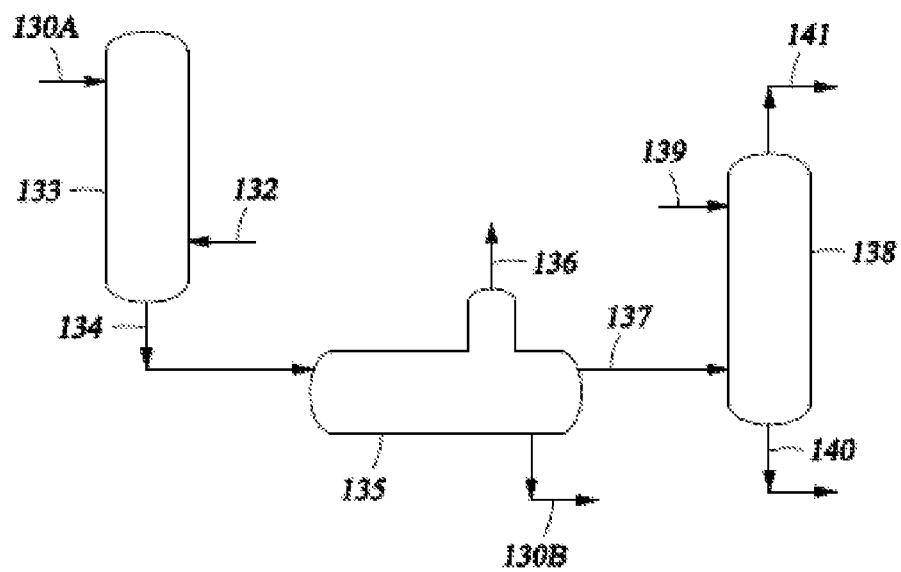
FIG. 4 schematically illustrates a process for upgrading a rich aromatics mixture.

As illustrated schematically in FIGS. 3 and 4, at least a portion of the rich aqueous amine mixture in line 130 is diverted to line 130A and conducted to stage 133, where the rich aqueous amine mixture is combined with aromatics conducted to stage 133 via line 132. For the process stream processed as described in the preceding section and shown in FIG. 2, the $C_{7+}$ hydrocarbon stream of line 570 generally comprises ≥90.0 wt. % hydrocarbon, based on the weight of the $C_{7+}$ hydrocarbon stream of line 570. The $C_{7+}$ hydrocarbon stream has sufficient aromatics content for removing foulant precursors from the rich aqueous amine mixture, e.g., ≥25.0 wt. %, based on the weight of the $C_{7+}$ hydrocarbon stream, such as ≥50.0 wt. %, or ≥75.0 wt. %. At least a portion of the $C_{7+}$ hydrocarbon stream of line 570 can be conducted to stage 133 via line 132. The combined mixtures can be conducted via line 134 to separator 135, e.g., a gravity-type separator (settling drum). At least a portion of any acid gases dissolved in the combined mixtures can be conducted away from stage 135 via line 136. An upgraded rich aqueous amine mixture can be conducted away from stage 135 via line 130B, with at least a portion thereof returned to line 130, e.g., upstream of heat exchanger 180 (connection not shown). At least a portion of any foulant in the upgraded rich aqueous amine mixture, whether formed from foulant precursors present in stages 133, 135, or the interconnecting lines, or otherwise, can be removed before regeneration, e.g., by filtration. If desired, the upgraded rich aqueous amine mixture can be degassed (e.g., to remove dissolved $H_2S$ and/or $CO_2$) before regeneration. The upgraded rich aqueous amine mixture can comprise, e.g., ≤0.4 wt. % red oil, e.g., ≤0.1 wt. %, such as ≤0.01 wt. %, based on the weight of the upgraded rich aqueous amine mixture. In certain embodiments, the upgraded rich aqueous amine mixture comprises ≤0.1 wt. % of foulant precursors, e.g., ≤0.05 wt. %, such as ≤0.01 wt. %, based on the weight of the upgraded rich aqueous amine mixture. Regeneration can be conducted under substantially the same conditions as in the conventional process, albeit with significantly less fouling.

A rich aromatics mixture is conducted away from separator 135 via line 137. The rich aromatics mixture generally comprises ≥50.0 wt. %, e.g., ≥75.0 wt. %, such as ≥90.0 wt. % of the rich aqueous amine mixture's foulant precursors, based on the weight of the rich aqueous amine mixture's foulant precursors. For example, the rich aromatics mixture can comprise about 30.0 wt. % to about 90.0 wt. % of $C_{6+}$ aromatics and ≥ about 1.0 wt. % of foulant precursors (such as about 5.0 wt. % to about 10.0 wt. % of foulant precursors), based on the weight of the rich aromatics mixture. Since it has been downgraded by the presence of amine (the separation of stage 135 is generally not perfect) and foulant precursors (especially sulfur-containing foulant precursors), the rich aromatics mixture cannot be utilized for the same purposes as those of the $C_{7+}$ hydrocarbon stream (which contains a valuable aromatics mixture) conducted away from stage 550 (FIG. 2) via line 570. Moreover, the rich aromatics mixture cannot be readily hydrotreated to remove sulfur-containing impurities because amine is a hydroprocessing catalyst poison. Accordingly, in conventional processes the rich aromatics mixture conducted away from stage 135 via line 137 is generally utilized for lower-value purposes, e.g., as a component for blending heavy fuel oil. For at least these reasons, process operators have turned to other methods for mitigating fouling during the use and regeneration of rich aqueous amine mixtures, e.g., those using additives to lessen the amount of fouling.

In certain embodiments of the invention, this difficulty is overcome without requiring anti-fouling agents or additives (or utilizing these in much smaller amounts), which would otherwise increase process complexity. In the process of these embodiments, the loss from the process of valuable naphtha boiling-range hydrocarbons lessened by utilizing an improved upgrading process, such as the one illustrated in FIG. 4. The invention will now be described with reference to the embodiment of FIG. 4. The invention is not limited to this embodiment, nor is it meant to foreclose other embodiments within the broader scope of the invention.

As shown in FIG. 4, the rich aromatics mixture of line 137 can be conducted to separation stage 138, e.g., for extracting from the rich aromatics mixture at least a portion of the mixture's amine. For example, water conducted to stage 138 via line 139 can contact the rich aromatics mixture for removing at least a portion of the rich aromatic mixture's amine. An extract comprising water and the removed amine can be conducted away from stage 138 via line 140. The extract generally comprises about 90.0 wt. % to about 99.0 wt. % water, ≤ about 1.0 wt. % amine, and ≤ about 100.0 ppmw of hydrocarbons, foulant, and combinations thereof. In certain embodiments, the lean aqueous amine mixture comprises ≥1.0 wt. % of the extract, based on the weight of the lean aqueous amine mixture. Because the foulant content has been significantly lessened compared to that of the rich aromatics mixture (e.g., lessened by a factor of at least 100.0 on a weight basis), the amine and water in the extract can be utilized, e.g., for producing the lean aqueous amine mixture of line 110 (FIG. 1), enabling the process to operate more efficiently, e.g. by recycling the extract to line 110 (FIG. 1).

An upgraded aromatics mixture (the raffinate) is conducted away from stage 138 via line 141. When the specified rich aromatics mixture is utilized and water is utilized as the extractant, the upgraded aromatics mixture can comprise, e.g., ≤1.0 wt. % of the rich aromatics mixture's amine, based on the weight of amine in the rich aromatics mixture. For example, the upgraded aromatics mixture can comprise, e.g., ≥90.0 wt. %, such as ≥95.0 wt. %, or ≥99.0 wt. % of the foulant precursors present in the rich aromatics mixture, based on the weight of foulant precursors in the rich aromatics mixture; ≤ about 500.0 ppmw of water; and ≤ about 100.0 ppmw amines (such as ≤ about 50 ppmw amines), the ppmws being based on the weight of the upgraded aromatics mixture.

Because the upgraded aromatics mixture has an amine content that is much less than that of the rich aromatics mixture (lessened by a factor of at least 100.0) the upgraded aromatics mixture can be utilized for improving process efficiency with little if any loss of valuable naphtha boiling range hydrocarbons to low-value uses. In certain embodiment, for example, at least a portion of the upgraded aromatics mixture can be recycled to the process, e.g., to stage 490 (FIG. 2).

In certain embodiments, ≥90.0 wt. % of the foulant precursors that are present in the upgraded aromatics mixture (e.g., ≥99.0 wt. %, such as substantially all foulant precursors, based on the weight of foulant precursors in the upgraded aromatics mixture) can be conducted away from separation stage 515 via line 516. Foulant precursors and any foulant conducted away from stage 515 can be utilized, e.g., for fluxing steam cracker-tar and/or for fuel oil blending. Stage 515 can be a stand-alone separation stage, as shown in FIG. 2, but this is not required, and in other embodiments the separation of stage 515 is accomplished, e.g., in stage 490 and/or hydroprocessing stage 520. For example, foulant and foulant precursors having atmospheric boiling points greater than that of the naphtha boiling range (about 0° C. to about 225° C.) can be conducted away via line 516. For example, ≥50.0 wt. % of foulant and foulant precursors having an atmospheric boiling point ≥225° C. are conducted away via line 516, e.g., ≥75.0 wt. %, such as ≥90.0 wt. %, based on the weight of the foulant and foulant precursors having an atmospheric boiling point ≥225° C. in the upgraded aromatics mixture. It has been observed that mild hydrotreating in stage 520 is suitable for converting and removing ≥50.0 wt. % naphtha boiling-range foulant precursors (if any) based on the naphtha boiling-range foulant precursors in the feed to the mild hydrotreating, e.g., ≥75.0 wt. %, such as ≥90.0 wt. %. This increases the process's yield of naphtha boiling-range hydrocarbon.

Figure 5:
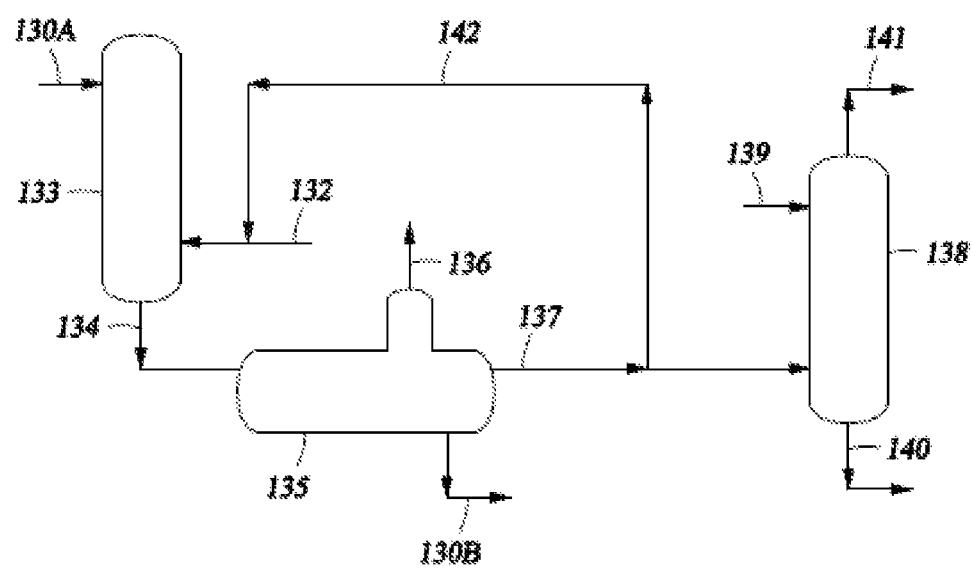
FIG. 5 schematically illustrates a process for upgrading a first portion of a rich aromatics mixture and utilizing a second portion of the rich aromatics mixture for removing foulant precursors from rich aqueous amine.

In certain embodiment, including those shown schematically in FIG. 5, at least a portion of the rich aromatics mixture can be conducted via line 142 from line 137 to stage 133, which significantly lessens the amount of the amount of $C_{7+}$ hydrocarbon stream from line 570 (a valuable source of naphtha boiling-range aromatics) that would otherwise be needed to accomplish the same purpose: removing foulant precursors from the rich aqueous amine mixture (and optionally establishing a specific gravity in the mixture of foulant precursors and aromatics that is ≤ about 0.95, e.g., ≤0.9, such as ≤0.85—so that gravity separation of the hydrocarbon and aqueous phases can be utilized in stage 135). For example, the rich aqueous amine mixture (from line 130A) and the aromatics mixture (from line 132) can be combined in stage 133 with at least a portion of the rich aromatics mixture, these mixtures being combined in stage 133 at a weight ratio in the range of about 25.0 to about 100.0 (rich aqueous amine mixture:aromatics mixture of line 132+rich aromatics mixture of line 142), such as in the range of about to 35.0 to about 75.0. In such embodiments, the amount of aromatics mixture conveyed to stage 133 via line 570 (and line 132) can be lessened by replacing a portion of this stream with an equivalent amount of rich aromatics mixture conveyed to stage 133 via line 142. In certain embodiments, the amount of the amount of $C_{7+}$ hydrocarbon stream from line 570 is lessened by a factor of ≥50.0% on a weight basis over embodiments that do not convey at least a portion of the rich aromatics mixture to stage 133. In certain embodiments illustrated schematically in FIG. 5, the rich aromatics mixture (line 137) is divided into at least first and second portions. The first portion can be conducted to stage 138, e.g., for extracting from the rich aromatics mixture at least a portion of the mixture's amine. The second portion can be conducted to stage 133 via line 142 for extracting foulant precursors from the rich aqueous amine mixture, e.g., by combining the second portion with the rich aqueous amine mixture and the $C_{7+}$ hydrocarbon stream of line 570 in stage 133, the $C_{7+}$ hydrocarbon stream of line 570 being conducted to stage 133 via line 132. Optionally, the second portion comprises ≥50.0 wt. % of the rich aromatics mixture, based on the weight of the rich aromatics mixture, e.g., ≥60.0 wt. %. The weight ratio of second portion:first portion can be, e.g., in the range of from about 0.1 to about 6, e.g., about 3 to about 6, such as about 4 to about 5. In certain embodiments, the second portion is combined in stage 133 with the rich aqueous amine mixture and the $C_{7+}$ hydrocarbon stream at a weight ratio [rich aqueous amine mixture:(second mixture+$C_{7+}$ hydrocarbon stream)] in the range of from about 12 to about 100, e.g., about 35 to about 75. Optionally, the weight ratio of the second portion:$C_{7+}$ hydrocarbon stream in stage 133 is in the range of from about 3 to about 6, e.g., from about 4 to about 5.

In certain embodiments, ≥50.0 wt. %, e.g., ≥o75.0 wt. %, such as ≥90.0 wt. % of the $C_{7+}$ hydrocarbon stream obtained from line 570 for removal of foulant precursors in stage 133 is returned to the process at stage 490 or location upstream thereof. Generally, no more than about 50.0 wt. % of the $C_{7+}$ hydrocarbon stream obtained from line 570 for removal of foulant precursors in stage 133, e.g., ≤25.0 wt. %, such as ≤10.0 wt. %, or even ≤1.0 wt. %, is conducted away from the process for low-value uses such as fuel oil blending, in contrast to conventional processes.

To improve the separation in stage 135, it can be desirable for the upgraded rich aqueous amine mixture and the rich aromatics mixture to have a specific gravity difference (defined as the specific gravity of the upgraded rich aqueous amine mixture minus that of the rich aromatics mixture) that is ≥0.05, e.g., ≥0.10, such as ≥0.15. In certain embodiments, this specific gravity in stage 135 is regulated by (i) holding the amount of the $C_{7+}$ hydrocarbon stream obtained from line 570 substantially constant and (ii) adjusting the amount of rich aromatics mixture diverted from line 137 to the second portion in line 142, to achieve the desired specific gravity difference.

EXAMPLE 1

Comparative

A rich aqueous amine mixture is provided to contactor 133 via line 130A of FIG. 3, the rich amine mixture containing 4.0 wt. % red oil based, on the weight of the rich aqueous amine mixture. A fresh aromatics mixture is provided to contactor 133 via line 132, the fresh aromatics mixture comprising ≥90.0 wt. % hydrocarbon based on the weight of the fresh aromatics mixture. The hydrocarbon component of the fresh aromatics mixture comprises ≥75.0 wt. % of $C_{7+}$ aromatics boiling in the naphtha boiling-range. The rich aqueous amine mixture is combined with the fresh aromatics mixture in contactor 133, and the effluent of contactor 133 is conducted via line 134 to gravity separator 135. The rich aqueous amine mixture is combined with the aromatics mixture in contactor at a weight ratio of 17 (rich aqueous amine mixture:fresh aromatics mixture), resulting in a specific gravity ("S.G.") difference in separator 135 (S.G. of aqueous phase minus S.G. of hydrocarbon phase) equal to 0.10. 98.0 wt. % of the effluent of line 134 is conducted away from separator 135 via line 130B as an upgraded rich aqueous amine mixture, the upgraded rich aqueous amine mixture comprising ≤0.4 wt. % red oil, based on the weight of the upgraded rich aqueous amine mixture. The upgraded rich aqueous amine mixture comprises ≤0.1 wt. % of foulant precursors, based on the weight of the upgraded rich aqueous amine mixture. Acidic gases comprising 2.0 wt. % of the rich aqueous amine mixture of line 130A, based on the weight of the rich aqueous amine mixture, are conducted away from separator 135 via line 136. A rich aromatics mixture is conducted away from stage 135 via line 137, the rich aromatics mixture containing ≥90.0 wt. % of the red oil contained in the rich aqueous amine mixture of line 130A. Since the rich aromatics mixture contains a significant amount of red oil and amine, it is conducted away for low-value uses such as fuel oil blending.

EXAMPLE 2

A rich amine mixture is provided to contactor 133 via line 130A of FIG. 5, the rich amine mixture containing 4.0 wt. % red oil based, on the weight of the rich aqueous amine mixture. A fresh aromatics mixture is provided to contactor 133 via line 132, the aromatics mixture comprising ≥90.0 wt. % hydrocarbon based on the weight of the fresh aromatics mixture. The hydrocarbon component of the fresh aromatics mixture comprises ≥75.0 wt. % of $C_{7+}$ aromatics boiling in the naphtha boiling range. The rich aqueous amine mixture is combined with the fresh aromatics mixture in contactor 133, and the effluent of contactor 133 is conducted via line 134 to gravity separator 135. The rich aqueous amine mixture is combined with the aromatics mixture from line 132 in contactor at a weight ratio of 50.0 (rich aqueous amine mixture: aromatics mixture). In other words, the amount of fresh aromatics mixture is only 0.33 times the amount of fresh aromatics mixture needed in Example 1. 98.0 wt. % of the effluent of line 134 is conducted away from separator 135 via line 130B as an upgraded rich aqueous amine mixture, the upgraded rich aqueous amine mixture comprising ≤0.4 wt. % red oil, based on the weight of the upgraded rich aqueous amine mixture. Acidic gases comprising 2.0 wt. % of the rich aqueous amine mixture of line 130A, based on the weight of the rich aqueous amine mixture, are conducted away from separator 135 via line 136. A rich aromatics mixture is conducted away from stage 135 via line 137, the rich aromatics mixture containing ≥90.0 wt. % of the red oil contained in the rich aqueous amine mixture of line 130A. The rich aromatics mixture is divided into first and second portions, the first portion comprising 25.0 wt. % of the rich aromatics mixture and the second portion comprising 75.0 wt. % of the rich aromatics mixture. The second portion of the rich aromatics mixture is conducted to contactor 133 via line 142, where the second portion is combined with the fresh aromatics mixture from line 132, resulting in a specific gravity difference in separator 135 (S.G. of aqueous phase minus S.G. of hydrocarbon phase) equal to 0.10. The first portion of the rich aromatics mixture is conducted to wash tower 139, where it is contacted with water, with water and amine being conducted away via line 140. A raffinate comprising an amount of naphtha boiling-range aromatics that is ≥90.0 wt. % of the aromatics conducted to contactor 133 via line 132, is conduced away from was tower 138 via line 141. Foulant precursors are removed from the raffinate, and the raffinate is then subjected to mild hydrotreating, e.g., for high-value uses such as producing fresh aromatics mixture and/or gasoline blending.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated. The term "comprising" is synonymous with the term "including". Likewise whenever a composition, an element or a group of components is preceded with the transitional phrase "comprising", it is understood that we also contemplate the same composition or group of components with transitional phrases "consisting essentially of," "consisting of", "selected from the group of consisting of," or is "preceding the recitation of the composition, component, or components, and vice versa."

What is claimed is:

1. A process for upgrading a hydrocarbon-containing process stream, the process comprising:
(a) providing a process stream comprising (i) ≥10.0 wt. % $C_{2+}$ olefins, (ii) ≥1.0 wt. % aromatics, (iii) ≥100.0 ppmw mercaptans, and (iv) ≥1.5×10³ ppmw H₂S, the weight percents and ppmw being based on the weight of the process stream;
(b) providing a lean aqueous amine mixture;
(c) contacting the process stream with the lean aqueous amine mixture and transferring to the lean aqueous amine mixture ≥60.0 wt. % of the process stream's H₂S, to produce (i) a rich aqueous amine mixture, the rich aqueous amine mixture comprising [HS⁻] ions and foulant precursors; and (ii) an upgraded process stream comprising (A) ≥60.0 wt. % of the process stream's olefins, (B) ≥60.0 wt. % of the process stream's aromatics, (C) <40.0 wt. % of the process stream's H₂S, and (D) ≥60.0 wt. % of the process stream's mercaptans;
(d) separating a first aromatics mixture from the upgraded process stream, the first aromatics mixture comprising at least a portion of the upgraded process stream's mercaptans and ≥10.0 wt. % of the upgraded process stream's aromatics;
(e) hydroprocessing ≥1.0 wt. % of the first aromatics mixture to produce a second aromatics mixture; and
(f) combining the rich aqueous amine mixture with the second aromatics mixture to transfer to the second aromatics mixture ≥60.0 wt. % of the rich aqueous amine mixture's foulant precursors, to produce an upgraded rich aqueous amine mixture and a rich aromatics mixture wherein (i) the process stream further comprises >0.1 wt. % CO₂ and (ii) the upgraded rich aqueous amine mixture further comprises one or more of CO₂, carbamate ions, or bicarbonate ions derived from the process stream's CO₂, and wherein the process further comprises removing CO₂ from the upgraded rich aqueous amine mixture.

2. The process of claim 1, wherein the hydroprocessing is mild hydrotreating.

3. The process of claim 1, further comprising:
(g) separating the upgraded rich aqueous amine mixture from the rich aromatics mixture and then dividing the rich aromatics mixture into at least first and second portions;
(h) extracting amine from the first portion of the rich aromatics mixture to produce an extract and a raffinate, wherein (i) the extract comprises ≥50.0 wt. % of the first portion's amine and <50.0 wt. % of the first portion's foulant precursors, and (ii) the raffinate comprises ≥50.0 wt. % of the first portion's aromatic hydrocarbon and ≥50.0 wt. % of the first portion's foulant precursors;
(i) adding at least a portion of the raffinate to the first aromatics mixture;
(j) removing at least a portion of any H₂S and/or at least a portion of any [HS⁻] ions from the upgraded rich aqueous amine mixture to produce a regenerated lean aqueous amine mixture, and adding at least a portion of the regenerated lean aqueous amine mixture to the lean aqueous amine mixture; and
(k) combining the second portion with the rich aqueous amine mixture and the second aromatics mixture in step (f).

4. The process claim 3, further comprising removing at least a portion of (i) any acid gases and/or (ii) foulant from the upgraded rich aqueous amine mixture upstream of step (j).

5. The process of claim 1, wherein the first aromatics mixture contains foulant precursors.

6. The process of claim 1, wherein process stream is produced by steam cracking.

7. The process of claim 1, wherein the process stream further comprises ≥100.0 ppmw of acetaldehyde based on the weight of the process stream.

8. The process of claim 3, wherein the second portion and second aromatics mixture are combined in step (f) at a weight ratio (second portion:second aromatics mixture) in the range of from 3 to 6.

9. The process of claim 3, wherein the lean aqueous amine mixture comprises ≥1.0 wt. % of the extract, based on the weight of the lean aqueous amine mixture.

10. The process of claim 3, wherein the rich amine mixture comprises water; ≥1.0 wt. % monoethanolamine; ≥10.0 wt. % of one or more acid gas salts; ≥0.1 wt. % of foulant precursors; and ≥0.1 wt. % hydrocarbon.

11. The process of claim 3, wherein the upgraded rich aqueous amine mixture comprises ≤0.05 wt. % foulant precursors, based on the weight of the upgraded rich aqueous amine mixture.

12. The process of claim 3, wherein the second aromatics mixture comprises ≥25.0 wt. % of $C_{7+}$ aromatics, based on the weight of the second aromatics mixture.

13. The process of claim 3, wherein the rich aromatics mixture ≥75.0 wt. % of the rich aqueous amine mixture's foulant precursors.

* * * * *